United States Patent [19]
Fan et al.

[11] 4,068,240
[45] Jan. 10, 1978

[54] VECTOR MAGNETIC INK JET PRINTER WITH STABILIZED JET STREAM

[75] Inventors: George Jee Fan, Ossining; David Chan-Wai Lo, W. Hurley; Joseph William Mitchell, Montrose, all of N.Y.

[73] Assignee: International Business Machines Corporation, Armonk, N.Y.

[21] Appl. No.: 752,948

[22] Filed: Dec. 20, 1976

[51] Int. Cl.² .......................................... G01D 15/18
[52] U.S. Cl. ..................................................... 346/75
[58] Field of Search ......................................... 346/75

[56] References Cited

U.S. PATENT DOCUMENTS

| 3,805,272 | 4/1974 | Fan | 346/75 |
| 3,959,797 | 5/1976 | Jensen | 346/75 X |
| 3,971,033 | 7/1976 | Fan | 346/75 X |

OTHER PUBLICATIONS

Fan, et al., Magnetic Deflector for MIJ Printing, IBM Tech. Disc. Bulletin, vol. 18, No. 4, Sept. 1975, pp. 1277–1278.
Fan et al., Simplified Approach to X-Y Printing, IBM Tech. Disc. Bulletin, vol. 18, No. 8, Jan. 1976, p. 2699.

Primary Examiner—Joseph W. Hartary
Attorney, Agent, or Firm—Charles P. Boberg

[57] ABSTRACT

A vector magnetic ink jet printer is arranged so that the ink droplets in the initial jet stream are alternately selected (i.e., magnetized) and unselected (unmagnetized). The interposition of unselected droplets between selected droplets prevents undesired magnetic interactions between selected droplets and gives them optimum spacing before they are deposited upon the recording surface, while at the same time keeping all of the droplets in sufficiently close proximity to give the stream aerodynamic stability. The gutter or catcher for unselected droplets is located between the second axial deflector (X deflector) and the recording surface. The magnetic field of the second deflector is specially shaped so that it can effectively control the trajectories of all selected droplets that have passed through the field of the first axial deflector (Y deflector), but without affecting the trajectories of unselected droplets aimed at the gutter. The selected and unselected droplets form separate substreams which have sufficient angular divergence in the X direction for enabling the unselected droplets to be guttered without excessively spreading their individual trajectories along that axis, since they are not affected by the X deflecting field, but the divergence is not great enough to disrupt the aerodynamic stabilizing action of each substream upon the other.

5 Claims, 6 Drawing Figures

VECTOR MAGNETIC INK JET PRINTER WITH STABILIZED JET STREAM

BACKGROUND OF THE INVENTION

This invention relates generally to ink jet printers and particularly to vector magnetic ink jet printers, otherwise known as "VMIJ" printers.

In a VMIJ printer a stream of ferrofluid ink droplets emitted under pressure from a vibratory nozzle is passed through the respective magnetic fields of successively arranged X and Y electromagnetic deflectors which have the combined effect of causing ink droplets to be deposited upon a recording surface along selected vectors or line segments to form printed characters or graphic plots thereon. Printers of this type are able to form printed characters in cursive fashion at higher speed with greater accuracy and with less waste of ink than other types of ink jet printers such as those which operate on the raster scan principle, whether they use electromagnetic or electrostatic deflection.

In a conventional VMIJ printer the X deflector (which deflects the magnetic ink droplets along a horizontal X axis) is positioned ahead of the Y deflector (which deflects the droplets along a vertical Y axis. In carrying out the present invention, it has been found preferable to reverse this sequence and have the Y deflector precede the X deflector. This is not a necessary condition, however. For convenience, in the present portion of this description, these two deflectors will be referred to simply as "first" and "second" deflectors without specifying their respective deflection axes, it being understood that such axes are in orthogonal relationship to each other and in substantially parallel relationship with the recording surface.

In a VMIJ printer it is desirable that the ink droplets be produced at a rate such that they will follow one another in sufficiently close succession to provide an aerodynamically stable jet stream. When the ink droplets are emitted at this rate, however, not all of the droplets which issue from the nozzle can be utilized for printing characters, and to separate those droplets which are to be used from those which are not needed in printing, the stream of droplets is first passed through a special type of magnetic deflector called "selector" before it reaches the first of the two axial deflectors described above. The present arrangement is such that when the droplets issue from the nozzle in which they are formed, they are aimed at an excess ink collection device called a "gutter" or "catcher." If a droplet is to be used in printing, it is "selected" by being magnetized by the selector. An "unselected" droplet (one not to be used in printing) is not magnetized as it passes through the selector. The selector exerts some deflecting action upon those droplets which it magnetizes, sufficient to divert such droplets from a course aimed at the catcher to one which will enable these droplets to reach the recording surface after passing successively through the magnetic deflecting fields of the first and second deflectors that are positioned between the selector and the recording surface. It should be understood, of course, that the selection process can be reversed, so that droplets which are to be guttered are magnetized while the "selected" droplets are not magnetized by the selector and are aimed away from the gutter.

In order that the catcher may function effectively to intercept the unselected droplets, it has been customary heretofore in designing VMIJ printers to place the catcher between the first and second deflectors where it catches the unselected droplets before they are subjected to the second deflecting field. Experience gained in working with prior designs of such deflectors has dictated the necessity of placing the catcher in this position because if the unselected droplets were permitted to pass through both deflecting fields before being caught, their respective courses may be so widely divergent by the time they pass through the second deflecting field that it would be impossible to locate the catcher properly for intercepting all of the unselected droplets.

Placing the Catcher between the first and second deflectors has several disadvantages, however. First, it causes the spacing between the two deflecting fields to be greater than it should be for optimum control, so that by the time the stream of selected droplets reaches the second deflector, it is apt to have an undesirably large "spread" along the axis of the first deflecting field, thereby decreasing the likelihood that the second deflecting field can effectively control all of the droplets that have passed through the first deflector.

A second disadvantage of catching the unselected droplets before they can enter the second deflector is that it prevents the employment of an "alternate selection" principle whereby the droplets to be used in printing are effectively separated from each other by unselected droplets. For best results it has been found that the droplets which are to be used for printing should not follow one another too closely. If the selected droplets are traveling too closely together, the leading droplet often is overtaken by and merged with the droplet behind it before it reaches the recording surface, with adverse effect upon the printing quality. It has been observed also that undesirable magnetic interactions will take place between selected droplets and cause erratic movements of these droplets if they are not adequately spaced from each other at every point in their travel. There is a better opportunity to produce printing of high graphic quality if the selected and unselected droplets are alternately arranged as they leave the selector and are caused to travel concurrently in slightly diverging substreams. This produces the desired spacing between selected droplets along their course of travel, and with the two substreams traveling in angular proximity to each other, each contributes a certain amount of aerodynamic stability to the other. This advantage is lost, however, if the substream of unselected droplets is abruptly intercepted by the catcher as it leaves the first deflector so that the substream of selected droplets passes by itself into the second deflector. There appears to be some need for the two substreams to proceed together on their divergent courses through both deflecting fields in order to minimize aerodynamic disturbances and obtain a stabilized stream of selected droplets all the way to the recording surface. For some reason not fully known, stream stability is adversely affected if the catcher halts the progress of the unselected substream as it emerges from the first deflecting field, thereby forcing the substream of selected droplets to proceed alone to the second deflector.

Thus, designers of prior VMIJ printers have been confronted with a dilemma. In order to retrieve the unselected droplets effectively, they have considered it necessary to place the catcher between the first and second deflectors; otherwise, the unselected droplets would be so widely scattered by the second deflecting field in the direction of the second deflection axis that they could not be "guttered" effectively. By doing this, however, designers of such equipment have in several ways substantially reduced the probability of obtaining high quality printing using the VMIJ technique. The innate advantages of the vector magnetic ink jet technique over other ink jet printing techniques are such that it would be highly desirable to produce a VMIJ printing apparatus wherein the above described factors which tend to detract from high graphic quality are rendered negligible, thereby enabling users of such printers to realize their full potential for achieving high quality printing with minimum waste of ink.

Summary of the Invention

An object of the present invention is to improve the design of vector magnetic ink jet printers so that the catcher or gutter can be located between the final deflecting field and the recording surface rather than between successive deflecting fields. Specifically, it is an object to improve the configuration of the final deflecting field so that it has little or no effect upon unselected ink droplets that are passing in its vicinity. An ancillary object is to utilize the alternate selection principle whereby selected droplets initially are interspersed with unselected droplets, and the two sets of droplets are caused to travel in divergent substreams, each of which contributes to the aerodynamic stability of the other substream, so that the selected ink droplets will be guided toward their target points with maximum accuracy and without any undesired merging of these droplets in flight.

In carrying out the aforesaid objectives, substantial departures have been made from the prior VMIJ printer design. The gutter or catcher now is located between the final deflector and the recording surface. This enables the two axial deflectors to be located more closely together, thereby reducing the spread of selected droplets along the axis of the first deflector while they are in the field of the second deflector. The final deflector, which in the present embodiment is the X deflector, has a unique construction enabling it to produce an X deflecting field that can accurately control the trajectories of selected ink droplets occupying a large span of positions along the Y axis without substantially affecting the trajectories of unselected droplets passing by this deflector toward the catcher. The X deflecting field, instead of being produced by pole pieces whose faces are arranged in a conventional wedge configuration on opposite sides of the droplet stream, is now produced by pole pieces having parallel faces located on one side of the stream so that the gap between pole pieces and the deflecting field lines produced thereby will extend generally parallel with the stream of selected droplets rather than transversely across it. Selected droplets pass through a strong inner region of this X deflecting field having an adequate spread in the Y direction, whereas unselected droplets (which travel a course angularly displaced in the X direction from the course along which selected droplets travel as they enter the X deflection field) will pass through a weak outer fringe of this field that has little or no effect upon their trajectories. Hence, unselected droplets now may flow through both deflecting fields and be caught by a Y-oriented gutter, located adjacent to the recording surface, which does not have to be made unduly large in the X direction since the trajectories of unselected droplets have no significant angular separation in that direction. Between the X and Y deflectors there is no intervening gutter structure to disturb the trajectories of ink droplets as they pass from the Y field to the X field. Because of this, it now is possible to use the alternate selection technique whereby the selector magnetizes alternate droplets so that each pair of selected (i.e., magnetized) droplets is separated from each other by at least one intervening unselected (i.e., unmagnetized) droplet, thereby greatly increasing the likelihood of producing printed records or documents having high graphic quality for the reasons noted above.

The foregoing and other objects, features and advantages of the invention will be apparent from the following more particular description of a preferred embodiment of the invention, as illustrated in the accompanying drawings.

DETAILED DESCRIPTION OF A PREFERRED EMBODIMENT

The drawings depict the significant features of a vector magnetic ink jet (VMIJ) printer embodying the invention. Details of mechanical construction and electrical circuitry that are familiar to persons skilled in the art of magnetic ink jet printing have been omitted from these views. The omitted details have been disclosed in prior references such as U.S. Pat. No. 3,805,272, issued on Apr. 16, 1974 to George J. Fan et al, and U.S. Pat. No. 3,971,033, issued on July 20, 1976 to George J. Fan, both of these patents being assigned to the assignee of the present patent application. The structure shown in the accompanying drawings is deemed adequate for an understanding of the present invention.

Figure 1:
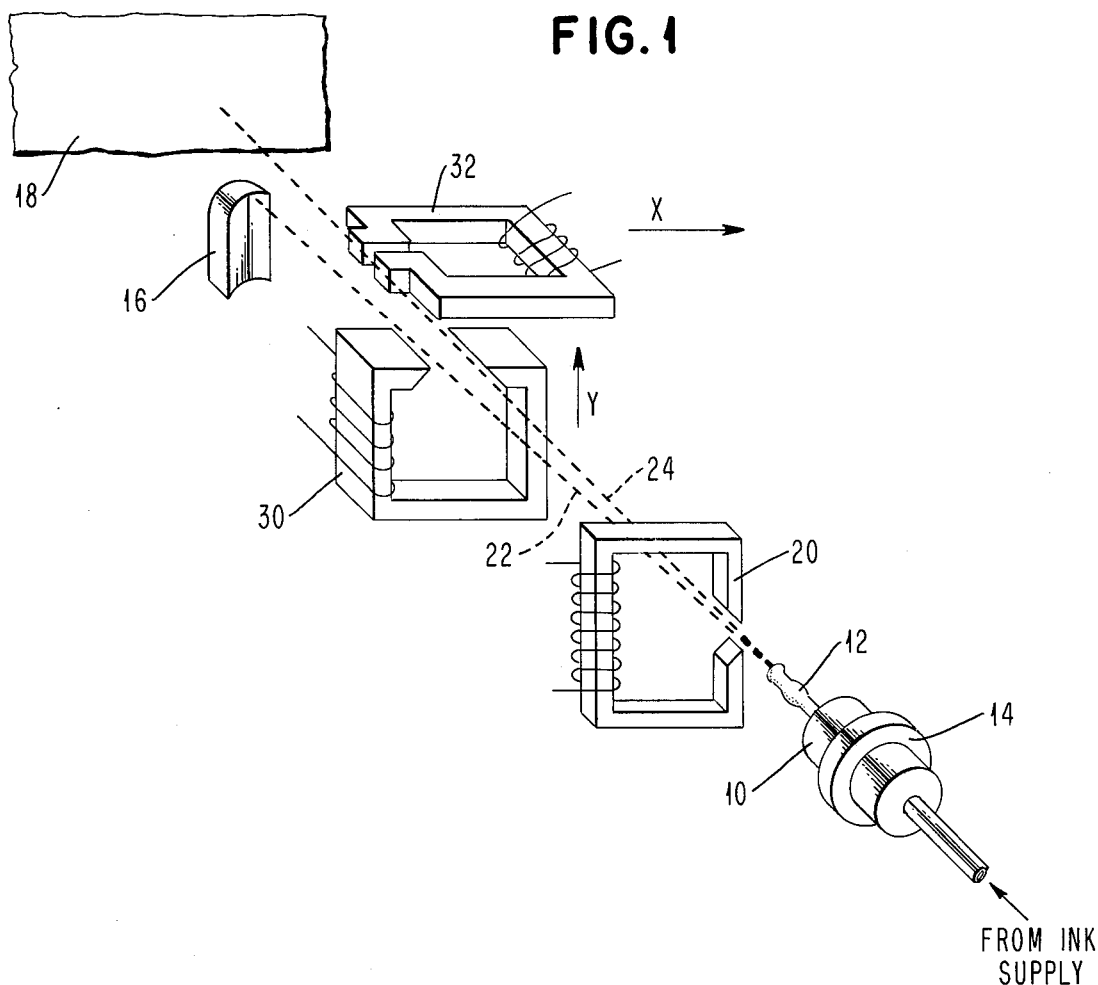
FIG. 1 is a schematic perspective view showing the essential elements of a vector magnetic ink jet printing apparatus which embodies the invention.
Figure 2:
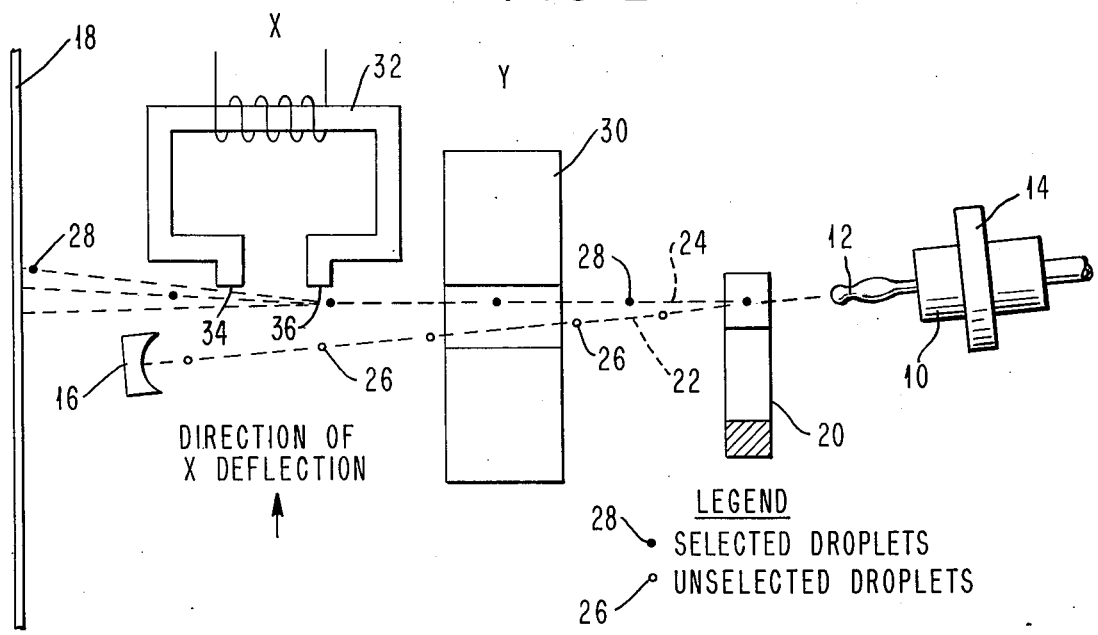
FIG. 2 is a top view of the apparatus schematically represented in FIG. 1, showing the manner in which selected and unselected droplets are formed into separate substreams.

Referring to FIG. 1, ferrofluid ink of a type described in the aforesaid U.S. Pat. No. 3,805,272, for example, is fed under pressure through a feed valve mechanism 10 to a nozzle 12, from which the ink issues as a jet stream of discrete droplets due to the action of a vibrator comprising a piezoelectric transducer 14 mounted upon the valve 10. As shown best in FIG. 2, the nozzle 12 initially directs the stream of droplets issuing therefrom toward a gutter or catcher 16 which is located in front of a recording surface 18 such as a sheet of paper upon which printing is to be accomplished. After leaving the nozzle 12, the stream of initially unmagnetized droplets passes through a gap between the pole pieces of an electromagnet 20 called a "selector." The winding of the selector 20 is intermittently excited by current pulses which are appropriately timed so to produce a magnetic field in the gap of the selector 20 whenever a droplet which is to be selected for printing is passing through this gap. Thus, the selected droplet becomes magnetized and is attracted away from its original path 22 aimed at the catcher 16 into a slightly divergent path 24 as indicated in FIGS. 1 and 2. Hence, as each droplet enters the field of the first axial deflector 26, which in this embodiment is the Y deflector, it will be traveling along a path 22 aimed at the catcher 16 if it is an unselected droplet 26 (that is, one that was not magnetized by the selector 20) or along a path 24 aimed away from the catcher 16 if it is a selected droplet 28 (one that was magnetized by the selector 20).

In order to optimize the aerodynamic stability of the ink jet stream, it has been found desirable to emit ink droplets from the nozzle 12 at a frequency that is likely to be too high for best graphic quality if all of these droplets were selected for printing. There are several factors that would tend to detract from graphic quality if every droplet emitted by the nozzle 12 at this high rate were magnetized by the selector 20 and thus directed along a course 24 which would cause them to impinge the recording surface 18. If the magnetized droplets are not adequately spaced from each other when leaving the selector 20, magnetic interactions among them may produce undesired deviations in their respective trajectories or variations in spacing among them. There also is a possibility that some of the leading droplets may become merged with droplets that are following too closely behind them as a result of these magnetic aberrations or simply because of the fact that each droplet progressively loses speed as the distance between it and the nozzle increases, such loss of speed being greater for some droplets than for others.

In order to achieve a satisfactory resolution of the conflicting requirements that there be, on the one hand, emission of droplets from the nozzle at a sufficiently high rate to produce a jet stream which is highly stabilized aerodynamically and, on the other hand, adequate spacing of droplets that are destined to impinge the target surface so as to optimize the vector printing operation, and "alternate selection" technique is herein proposed. Thus, in accordance with this concept, every second droplet passing through the gap of selector 20 during a vector printing operation becomes magnetized by the field of this selector and is attracted into a path 24 that is aimed away from the ink catcher 16. Hence, the spacing between these selected droplets as they leave the selector 20 is about double the initial spacing between droplets as they enter the selector 20, with an unselected droplet intervening between each pair of successively selected droplets. It is understood, of course, that this selection technique may be modified, if desired, to interpose more than one unselected droplet between each pair of successively selected droplets.

The action of the selector effectively creates two substreams of droplets, one substream consisting of unselected droplets traveling along the original course 22 toward the catcher 16, and the other substream consisting of selected droplets that have been diverted into a course 24 that has a slight but significant angular displacement from the substream that was first described. These two substreams of selected and unselected droplets continue on their slightly divergent courses through (or in some cases, past) the respective magnetic fields of a Y deflector 30 and an X deflector 32, arranged in the sequence named between the selector 20 and the recording surface 18. No significant loss of aerodynamic stability is caused by this separation since the two jet streams are still in fairly close proximity to each other. The substream of unselected droplets is terminated at the catcher 16 just a short distance from the recording surface 18, after these droplets have traversed both the first and second axial deflectors 30 and 32. By the time it reaches this point, the substream of selected droplets has been so well stabilized that these droplets can traverse the remaining distance to the surface 18 with accuracy.

For vector printing purposes, a succession of selected droplets is subjected in varying amounts of deflection along two orthogonally related axes herein designated Y and X, the Y axis being substantially vertical and the X axis substantially horizontal in an assumed environment where the recording surface 18 is in a vertical plane parallel to both of these axes. The X and Y deflecting fields are "gradient" magnetic fields, that is, fields in which the magnetic intensity at any point is dependent upon not only the electrical current in the winding of the deflector but also the distance of the point from the pole faces of the deflector. The particular construction of each deflector will be described presently. In accordance with the invention, both selected and unselected droplets are subjected to any deflecting force in the Y (upward) direction that may be exerted upon them by the magnetic field of the first deflector 30, but only the selected droplets will be subjected to any significant deflection in the X (right horizontal) direction by the second deflector 32, because the magnetic field of this second deflector is specially shaped so that unselected droplets pass through only a weak outer fringe of this field and are substantially unaffected by it.

At this point in the description it is thought advisable to restate the definition of a "selected" droplet as one that has been exposed to a magnetic field generated by the selector 20 so that such a droplet is diverted from its original course 22 to an angularly displaced course 24. All droplets which are not magnetized by the selector 20 and which therefore continue on their original course 22 are "unselected". The selection process naturally causes the ferrofluid in the selected droplet to become magnetized. Whether this initial magnetization persists, and for how long, will depend upon the degree of remanence that the ferrofluid possesses. The remanence need not be high. As each selected droplet enters a subsequent deflection field, whether such field is produced by the first deflector 30 or the second deflector 32, it is remagnetized by that field at the same time that it is being deflected thereby. It is not accurate to use the terms "selected" and "magnetized" interchangeably, however, because a droplet once selected remains "selected", irrespective of what may happen to its remanent magnetism while it traverses the distances between successive magnetic fields. Conceivably a selected droplet may be devoid of remanent magnetism when it is outside of any magnetic field. It should be noted also that an unselected droplet may become at least temporarily magnetized while passing through the Y deflecting field, and conceivably it may retain such magnetism at least for a time while traveling toward the catcher 16. Thus, selected droplets are not necessarily magnetized at all points of their travel between the selector 20 and the paper 18, nor are unselected droplets unmagnetized at all points of their travel between the selector 20 and the catcher 16. The distinction resides solely in the choice of divergent courses 22 and 24 into which each droplet may be directed by the selector 20.

Figure 3:
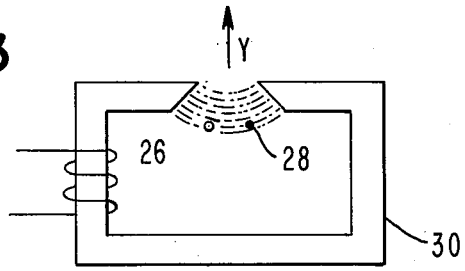
FIG. 3 is a detail side view of the first or Y deflector, indicating its magnetic field distribution.

In the present embodiment both the selector 20 and the Y deflector 30 have pole faces disposed in converging planes to define a wedge-shaped air gap in each instance. As explained in the aforesaid Fan U.S. Pat. No. 3,805,272, this type of pole construction causes a gradient magnetic field to be produced in the air gap between pole faces, the configuration of the magnetic field lines being indicated (in the case of the deflector 30) by the curves drawn in FIG. 3. Both the selected droplets 28 and the unselected droplets 26 enter this gap and are deflected upwardly in directions normal to the field lines therein when the electromagnet is energized. In the case of the deflector 30 the amount of deflection varies with the current in the winding. In the case of the selector 20, the amount of deflection is the same for all deflected droplets and is zero for unselected droplets. The slanted pole faces are separated by a substantial clearance opening even at their closest points (FIG. 3) so that a droplet may be deflected past these points without striking the pole structure.

Upon leaving the first deflector 30, each droplet will be traveling at the desired angle upwardly from the path which it initially had when it entered the field of this deflector. This chosen amount of Y deflection will place each selected droplet at the desired vertical coordinate on the paper 18 when it impinges that surface. It remains, however, to impart the proper amount of horizontal or rightward deflection to each selected droplet so that it also will impinge the surface 18 at the desired horizontal coordinate thereon. This is the function of the X deflector 32. Unselected droplets are not given any signficant X deflection and are captured by the gutter 16.

Figure 4:
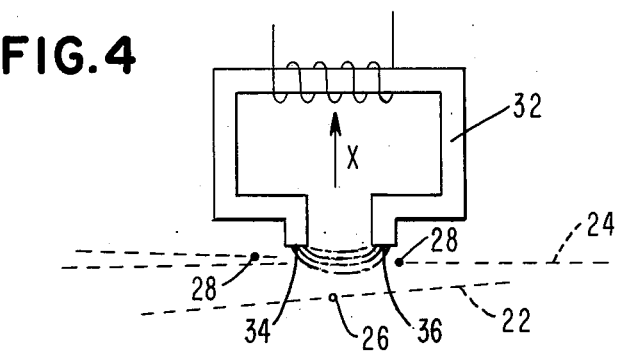
FIG. 4 is a detail plan view of the second or X deflector, indicating its magnetic field distribution.

Referring now to FIGS. 2 and 4, selected droplets 28 which have been directed along a course having the horizontal angular position denoted by the line 24 will pass through a part of the magnetic deflecting field generated by the X deflector 32 which is much stronger than the weak outer fringe portion of this magnetic field through which unselected droplets 26 traveling along the divergent course 22 will pass. The pole structure of the X deflector 32 is so designed that even with maximum exciting current in the coil or winding of deflector 32, there will be no significant deflection unselected droplets 26 in the X direction.

Figure 5:
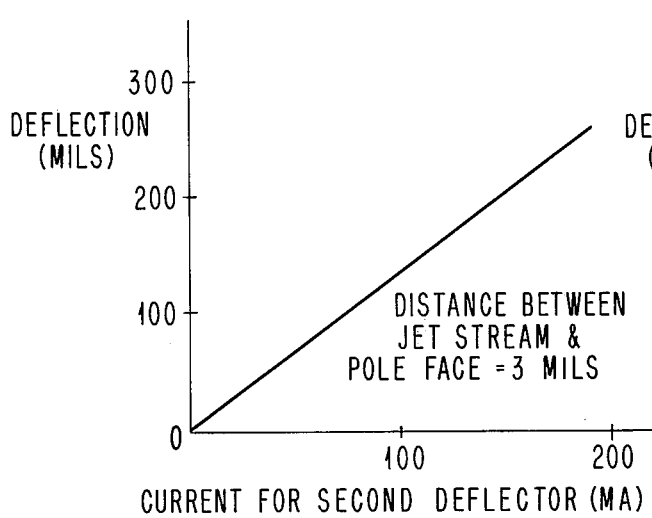
FIGS. 5 and 6 are graphs which respectively represent the deflection-versus-current and deflection-versus-distance characteristics of the second or X deflector shown in FIG. 4.
Figure 6:
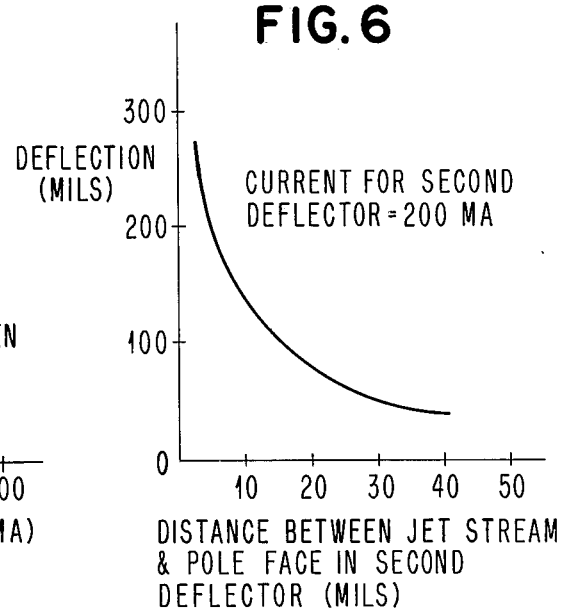

The pole faces 34 and 36 are parallel with the path 24 of the selected droplets, and they establish a magnetic field whose lines of force likewise extend generally parallel with this path and are concentrated near the plane in which the pole faces 34 and 36 lie. The excitation current intensity is varied in accordance with the amount of angular deflection which must be given to each selected droplet 26 in order to accomplish the desired vector printing function. As shown by the graph of deflection-versus-current in FIG. 5, the deflection along the X axis varies linearly with the current. On the other hand, as shown by FIG. 6, the deflection will vary inversely and nonlinearly with the distance between a pole face and a droplet which is passing by it, so that even a strong current will not cause significant deflection of a droplet that has been diverted a relatively short distance away from the pole structure 34, 36, as in the case of the unselected droplets 26, FIGS. 2 and 4.

Inasmuch as the unselected droplets 26 are given no significant deflection in the X direction by the second deflector 32, the catcher 16, FIGS. 1 and 2, may have a relatively narrow dimension in the X direction to correspond with the very slight spread of unselected droplet trajectories in that direction. Moreover, since the catcher 16 is located relatively close to the recording surface 18, it does not disrupt the stabilizing aerodynamic interaction between the jet streams of unselected and selected droplets until each selected droplet as almost reached the end of its travel, by which time it no longer needs further stabilization to find its correct target point. The magnetic field produced by the X deflector 32 has a sufficient spread along the Y axis to exert uniform X deflecting forces upon selected droplets 28 for any given current value regardless of the displacements respectively imparted to such droplets along the Y axis by the Y deflector 30.

The illustrated apparatus is designed to print one character at a time upon the recording surface 18, and the appropriate relative motions are produced between the surface 18 and the printing apparatus to arrange the printed characters at selected positions in successive lines. If it is desired to print a whole line of characters at a time, the character printing apparatus can be modified to accomplish this. The first deflector 30 would be oriented so that it deflects the droplets in the X direction, and the second deflector 32 would be oriented to deflect selected droplets in the Y direction without imparting any significant Y deflections to unselected droplets. This would make it feasible to use a gutter that extends parallel with the printed line in a position above or below it, and the nozzle which emits the droplets then is aimed at such a gutter. In a line printer the character printers may be arranged in staggered relationship in two rows, one row of printers using a gutter positioned above the printed line while the other row uses a gutter below this line.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a vector magnetic ink jet printing apparatus wherein droplets of ferrofluid ink are directed alternatively to a recording surface or to an intercepting catcher, the combination comprising:

means for producing a stream of ink droplets substantially all of which are initially directed along a first course toward said catcher, an electromagnetic selector operable to divert selected ones of the droplets in said stream from said first course to a second course which enables the selected droplets to avoid said catcher and impinge said surface while permitting the unselected droplets to continue traveling along said first course toward said catcher, a first electromagnetic deflector which is operable to deflect at least some of the droplets in said stream selectively along a first one of two axes orthogonal to said stream, thereby to place such deflected droplets into selected trajectories according to the respective deflections imparted to them along said first axis, and a second electromagnetic deflector positioned between said first deflector and said catcher which is operable to impart selected deflections along the second of said orthogonal axes to at least some of those selected droplets that previously were directed along said second course, whereby the final trajectory of each such droplet is determined by the respective deflections imparted to it along said two axes by said first and second deflectors, said second deflector having a pole structure so arranged that its magnetic field is unable to prevent unselected droplets that were not diverted out of said first course from reaching said catcher.

2. A printing apparatus as specified in claim 1 wherein the pole structure of said second deflector is arranged to produce a magnetic field whose lines of force extend generally parallel with said second course and whose intensity in the portions thereof traversed by said unselected droplets is insignificant compared with its intensity in the portions thereof traversed by said selected droplets.

3. A printing apparatus as specified in claim 2 wherein said pole structure has faces spaced from each other along said second course and arranged substantially parallel therewith.

4. A printing apparatus as specified in claim 1 wherein said selector is so operated as to cause those droplets which are selected for diversion into said second course to be interspersed with unselected droplets that will continue to be directed along said first course.

5. A printing apparatus as specified in claim 4 wherein said selector causes selected and unselected droplets to be directed alternately along said second and first courses, respectively.

* * * * *